Dec. 3, 1929.                J. C. SCHELLENG                1,738,266
                              RECTIFIER SYSTEM
                            Filed Nov. 14, 1924
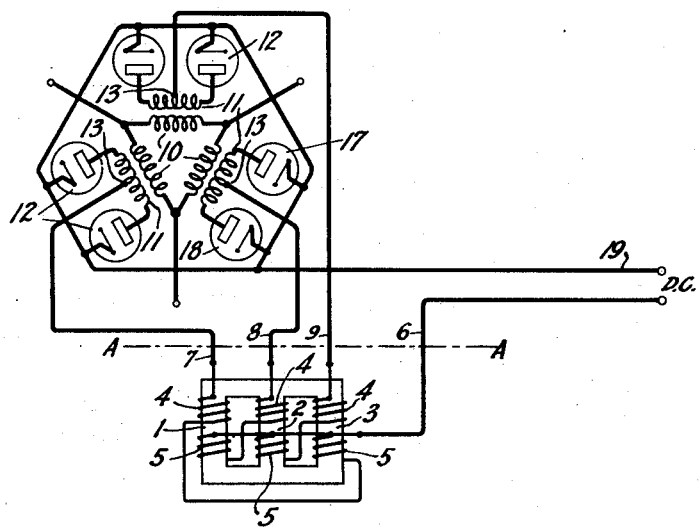
Fig.1
Fig.2
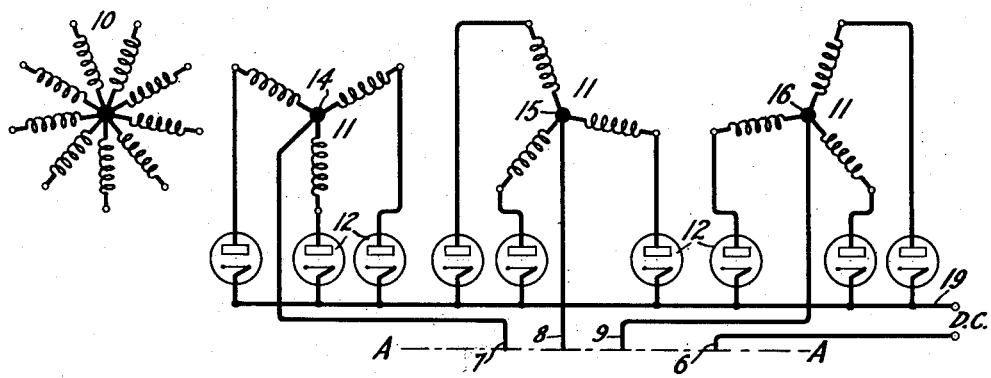
Fig.3
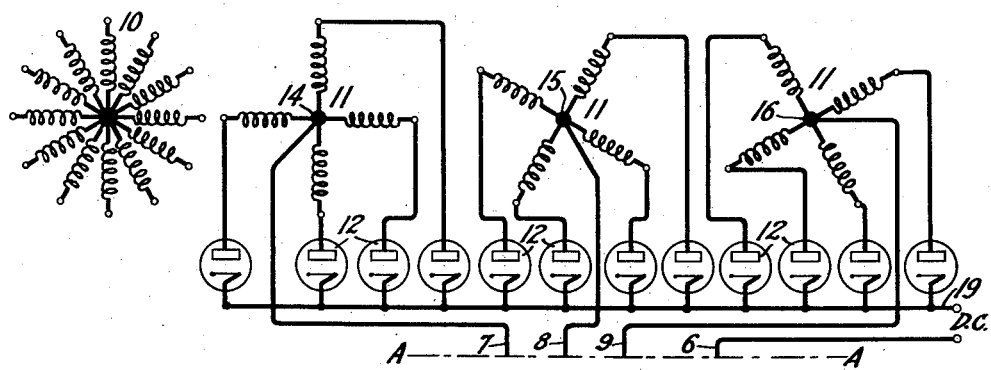
Inventor:
John C. Schelleng
by E. W. Adams Att'y.

Patented Dec. 3, 1929

1,738,266

UNITED STATES PATENT OFFICE

JOHN C. SCHELLENG, OF MILLBURN, NEW JERSEY, ASSIGNOR TO WESTERN ELECTRIC COMPANY, INCORPORATED, OF NEW YORK, N. Y., A CORPORATION OF NEW YORK

RECTIFIER SYSTEM

Application filed November 14, 1924. Serial No. 749,858.

This invention relates to rectifier systems and more particularly to arrangements for rectifying polyphase currents.

One object of the invention is to increase the output power supplied by a system employing rectifier tubes of a given size.

Another object is to cause each rectifying tube to be operative during a period greater than has been the case in previous systems.

A further object is to improve the voltage regulation of a rectifier system.

A feature of the invention is a three-phase, interphase reactor included in the D. C. circuit of a rectifier system in such a manner that the anode is positive with respect to the cathodes in at least three tubes at the same time.

In a high power rectifier system as disclosed herein the above and other objects are attained by employing a polyphase transformer having its secondary windings separated into electrically independent groups from the mid-points of which connections are taken to a polyphase interphase reactor. For any multiple of three phases the reactor comprises a core type magnetic structure having three limbs. Each limb carries two windings. Each path from a rectifier element to the load circuit by way of the interphase reactor includes two windings on different limbs of the reactor. The two windings on each limb are in electromagnetic opposition.

The novel features which are believed to be characteristic of this invention will be pointed out with particularity in the claim appended hereto. The invention itself, however, as to the details of its organization and its mode of operation, will be better understood by referring to the following description taken in connection with the accompanying drawing in which:

Fig. 1 is a diagrammatic representation of a six phase rectifier system embodying this invention.

Fig. 2 is a substitution for that portion of Fig. 1 above the line A—A to adapt the invention to a nine phase rectifier system.

Fig. 3 shows a similar adaptation of the portion of Fig. 1 above the line A—A to a twelve phase system.

In Fig. 1 is shown an interphase reactor comprising a core type magnetic circuit having three limbs or legs 1, 2 and 3, on each of which are wound sections of two coils 4 and 5. Coil 4 on limb 1 is connected to the coil 5 on limb 3, coil 4 on limb 2 is connected to coil 5 on limb 1, and coil 4 on limb 3 to coil 5 on limb 2 in such a manner that the currents traversing the sections wound on the respective limbs of the core are in opposition. The free ends of coils 5 are connected to conductor 6 of the rectified current circuit, and the free ends of the sections of coil 4 are respectively connected by conductors 7, 8 and 9 to a neutral potential point of each phase of the source supplying alternating current to be rectified.

As described above each limb of the magnetic core carries two coil sections supplied with rectified current flowing in opposite directions. Since the direct current component of the rectified current traversing each coil section is of the same value, there will be no magnetic flux produced in the core due to this component.

The order of the windings on the different sections 1, 2 and 3 specified above may be altered provided two coils on one limb are not connected together. If a reactor of more than three limbs is used in a polyphase system this relation of the coils should be maintained.

In the system illustrated in Figs. 1, 2 and 3 polyphase alternating current to be rectified is supplied through a transformer having primary windings 10 and secondary windings 11. The primary windings are respectively connected to the different phases of the alternating current source, not shown. Rectifying devices 12 are connected between each of the terminals of the secondary windings 11 and the rectified current lead 19. Devices 12 are shown as space discharge tubes, but may be any other suitable rectifying means. The anode of each rectifier 12 is shown connected to one terminal of the secondary windings and its cathode to the rectified current circuit or line conductor 19. However these connections may be reversed if desired.

The mid-points 13, Fig. 1, of the secondaries 11 are connected to coils 4 of the interphase reactor by leads 7, 8 and 9 respectively. In the nine phase systems shown in Fig. 2 and the twelve phase systems shown in Fig. 3, the secondaries 11 are separated into three groups, each group comprising in itself a balanced polyphase system of one third the number of phases of the entire apparatus. The mid-points 14, 15 and 16 of the three groups are connected to leads 7, 8 and 9 respectively.

Although Figs. 1, 2 and 3 refer to six phase, nine phase and twelve phase systems, respectively, a description of the operation of the six phase system shown in Fig. 1 will be sufficient to explain the operation of all systems having $3n$ phases.

The current in line 6, (19) may be resolved into a direct current component, an A. C. component of the frequency supplied by the source and various A. C. components harmonically related to the frequency of the source. The fundamental and odd harmonics will be balanced out in leads 7, 8 and 9 as may be shown by considering the operation of tubes 17 and 18 used to rectify the current supplied by one phase of the six phase source. The alternating current components of fundamental frequency and odd harmonics thereof transmitted through these two tubes will be in opposite phase, i. e. 180° apart, and will be balanced out in lead 8 connected to the mid-point 13 of the transformer secondary winding 11 whereas current impulses of even harmonic frequencies will be in phase with each other, and hence a current equal to their sum will flow through lead 8. With reference to leads 7 and 9 the conditions as to current flow will be the same.

The direct current, the 6th harmonic and harmonics that are multiples of the 6th are in the same phase relationship in the leads 7, 8 and 9 at every instant hence the magneto motive force due to these components in coils 4 and 5 will be equal and opposite and will balance out with the result that voltages of these frequencies are applied to the load 6, 19 unimpeded. As all other even harmonics however are in three phase relationship they will produce in the reactor a flux which will operate to impede them and hence reduce the amplitudes of these harmonics flowing through the leads 7, 8 and 9. It is the reduction of these harmonics that effects a change in the wave form to permit current to flow in the tubes for a greater period of time than would otherwise be the case.

The divided secondaries 11 operate as six independent single phase systems so that current will flow in one of the tubes connected to each secondary at every instant making three parallel paths for the rectified current. This permits smaller tubes to be used than in the case where only one is operative at a given instant.

In the systems illustrated in Figs. 2 and 3, the secondaries are connected in three groups to constitute separate polyphase systems having mid-points 14, 15 and 16 which are connected to the leads 7, 8 and 9 of the interphase reactor. In the system of Fig. 2, for example, there are provided three separate three phase systems. Each of these operates in a manner similar to that described above with reference to Fig. 1 and cooperate to rectify the current supplied by a single nine phase source. The system differs from that of Fig. 1 in the respect that all harmonics up to the 9th are eliminated. In the system of Fig. 3, having twelve phases, the lowest harmonic present is the 12th. Current will flow in each of the three phase systems at every instant, so that there are provided at least three parallel paths for the rectified current impulses produced by the nine phase rectifier. The resistance offered to the flow of rectified impulses will be considerably less than in the systems heretofore proposed, and consequently smaller rectifying tubes may be used than in the systems previously proposed in which each tube carried the entire rectified current during its period of operation.

Although the invention has been shown and described as applied to particular systems for the purposes of clearly and completely disclosing its principles, it is to be understood that this invention is of general application and therefore is not to be limited to the specific details disclosed.

What is claimed is:

In a rectifying system, a polyphase source, a plurality of rectifying devices, means comprising a plurality of sections for inductively coupling said source to said devices, said sections being arranged in electrically independent groups provided with neutral points, a rectified current circuit and a reactive device included in said rectified current circuit, said reactive device comprising a common magnetic circuit having a plurality of cores and a plurality of sectionalized windings arranged on said cores in such manner that current from each of said neutral points traverses two of said windings in series, said series windings being on different cores, for impeding the flow of certain harmonic components of the rectified current.

In witness whereof, I hereunto subscribe my name this 11th day of November, A. D., 1924.

JOHN C. SCHELLENG.